United States Patent [19]

Hall, Jr.

[11] 4,198,813
[45] Apr. 22, 1980

[54] LINK FOR CONTINUOUS CHAINS
[76] Inventor: Raymond I. Hall, Jr., 303 Ellen Ave., Savoy, Ill. 61874
[21] Appl. No.: 931,491
[22] Filed: Aug. 7, 1978
[51] Int. Cl.² .............................................. F16G 13/18
[52] U.S. Cl. ..................... 59/80; 74/245 C; 74/250 C; 74/251 C
[58] Field of Search .............. 59/78, 8, 35, 31, 34, 59/80; 74/245 R, 245 C, 248, 250 R, 250 C, 246, 251, 251 C, 252, 258; 219/51, 52

[56] References Cited
U.S. PATENT DOCUMENTS

| | | | |
|---|---|---|---|
| 344,178 | 6/1886 | Garland | 74/254 |
| 542,952 | 7/1895 | Whiteley | 74/251 R |
| 882,317 | 3/1908 | Howe | 59/8 |
| 2,444,812 | 7/1948 | Crowley | 59/5 |
| 3,665,704 | 5/1972 | Trudeau | 59/85 |

FOREIGN PATENT DOCUMENTS
1016106  11/1952  France .......................................... 59/5

*Primary Examiner*—Francis S. Husar
*Assistant Examiner*—Gene P. Crosby
*Attorney, Agent, or Firm*—David V. Munnis

[57] ABSTRACT

Link unit of the U-shaped type for use in making continuous chains by interfitting connection with pintles of the base segment of the unit between and to the spaced leg segments of a preceding unit in the chain wherein the leg segments of the units are provided at their ends with slotted bosses for receiving a connecting pintle, the boss slots are adapted to receive plug welds to rigidly weld and attach a connecting pintle to the bosses, and outwardly extending arms are positioned on the leg segments of the link unit forward of and adjacent to the leg segment bosses. In preferred embodiments the plug weld slots are positioned on the rear faces of the leg segment bosses to minimize shear on the plug weld. The link is interchangeable with links in existing chain systems and has improved investment and operating cost characteristics and improved strength and wear properties.

11 Claims, 11 Drawing Figures

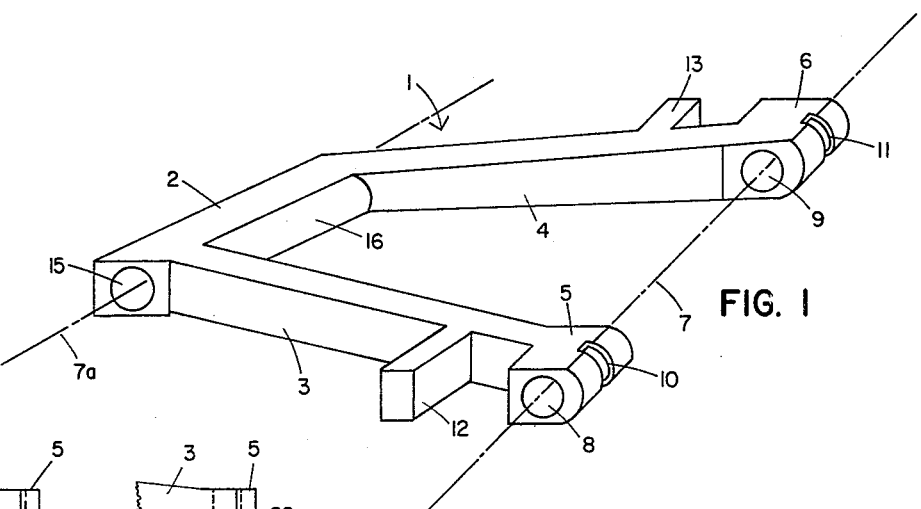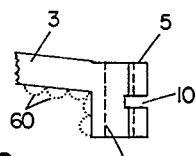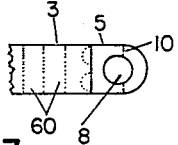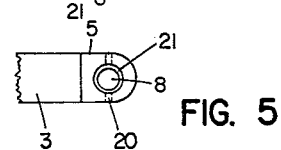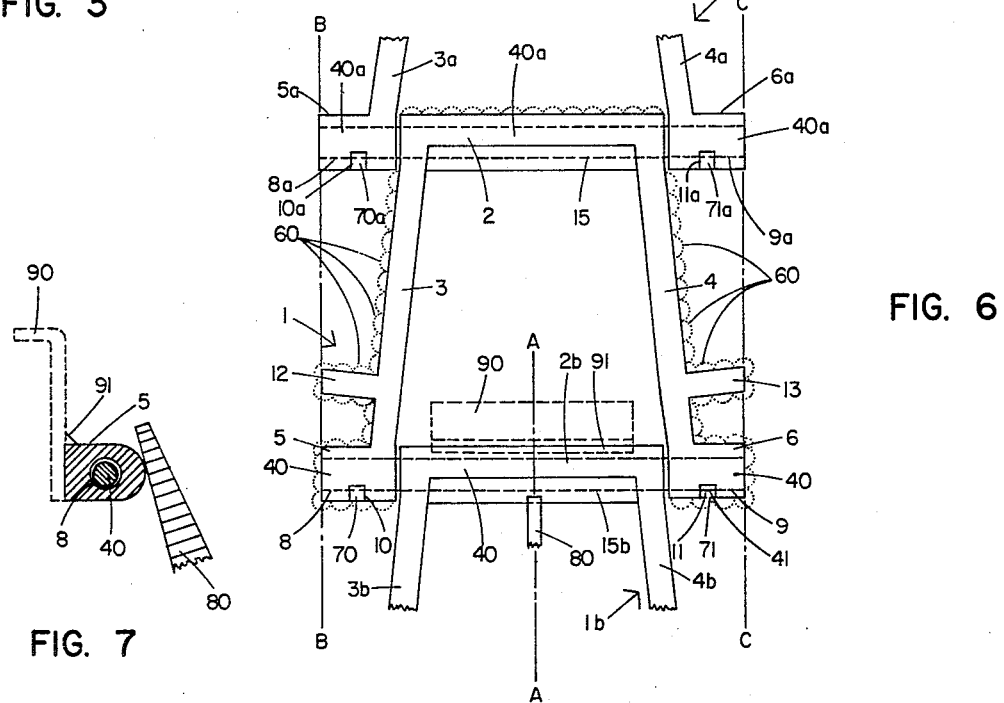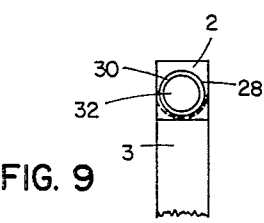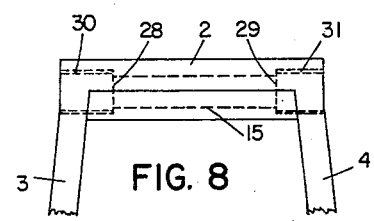

LINK FOR CONTINUOUS CHAINS

BACKGROUND OF THE INVENTION

The present invention relates to links for continuous chains and more particularly to links of chains utilized to convey or "drag" particulate material.

Continuous chains formed of links having U-shaped frames and consequently openings in the interiors thereof have long been used to convey, commonly known as "drag", particulate material of sizes ranging from finely divided to briquetted solids. In all such applications, particularly in industrial applications where chain conveyor operation is over extended intermitent or continuous periods, wear on the chain link units is a significant problem due to abrasion between conveyed particles and the links. Wear problems are aggravated in instances, such as in foundries, where it is required that the links convey particulate material through environments of widely differing temperatures, including those ranging from normal atmospheric ambient conditions to elevated temperatures ranging up to and over 400° C.

Due to such wear problems, it is imperative in utilization of any chain conveyor system that the system periodically be shut down to remove deteriorated, worn and/or broken links of the conveyor chain with an attendant increase in equipment investment expenditures and operating costs due to the expenses of the replacement link units, losses in production time and incurrance of repair labor time. Expenditure losses in terms of lost production time and repair labor often are particularly acute when a conveyor chain system is interrupted due to link breakage. In many such cases the broken link is positioned in the path of the chain where it is only accessible with difficulty. In any event, link replacement effects are hampered, due to the designs of conventional conveyor link chains in which connecting pintles for successive link units are held in place by means of locking pins and the like, and problems are encountered in properly positioning the involved link units to align the slots, etc., of the separate elements of the to-be-connected units to allow operative placement of the locking pins.

To attempt to minimize wear problems in chain conveyor systems it has been proposed to construct the links thereof from expensive specifically selected alloys. In many cases, such as with chain conveyor systems employed in foundry operations, the use of special alloys for the chain links has not proved to be completely suitable due initially to the requisite increased equipment expenditure and due to the fact that many alloys available still develop pin holes and/or wear unevenly and/or even prematurely fracture stemming from imperfections in the alloy material introduced in one or more of the alloying, molding, heat treating and/or quenching steps involved in producing the links. Another suggested approach to minimize such wear problems has involved the application to some or all of the link surfaces of a coating of an abrasion-resistant material such as is formed by fusing welding electrode material to the link surfaces desired to be protected. This approach, however, while it has achieved some success in extending service life of some links, has still suffered drawbacks in use due to the aforedescribed problems of costly delays in achieving alignment of conventional locking elements when chain disassembly for repair is necessary.

Accordingly, a search has continued in the art for an improved link for continuous conveyor chains which is relatively inexpensive, has extended wear life, and is readily adapted for assembly into and disassembly from a chain system.

OBJECTS OF THE PRESENT INVENTION

Accordingly, it is the primary object of the present invention to provide a new improved link for continuous chains and more particularly for chains used in conveying or "dragging" particulate material.

Another object of the present invention is to provide an improved link for continuous chains having extended wear characteristics.

An additional object of the present invention is to provide a novel link for continuous chains which, when compared to links formed of a similar metal, has an extended useful life due to its abrasion-resistant characteristics.

An additional object of the present invention is to provide a new link for continuous chains which eliminates the need in many material conveyor operations for the utilization of links formed of expensive alloys.

Still another object of the present invention is to provide a new link for continuous chains which advantageously due to initial investment costs and operating characteristics is more economic in use than conventional prior art links in comparable applications.

Yet a further object of the further invention is to provide a new link for a continuous chain which is relatively inexpensive and efficient in operation and yet is adapted to be used interchangeably in conventional conveyor chains systems of the U-shaped unit construction.

Still an additional object of the present invention is to provide a novel link for continuous chains which is readily adapted to be easily assembled into and disassembled from an existing conveyor chain system. A particular object of the present invention is to provide a novel link which is relatively inexpensive and has advantageous operating characteristics particularly adapting it for use in chain systems for conveying and "dragging" particulate material.

Still further objects of the present invention are to provide improved continuous chain systems advantageously having links of the above described advantageous properties.

The above objects and other advantages are achieved and are characteristics of the link unit and a continuous chain formed from same, which link unit, broadly described, comprises a U-shaped frame member having a cylindrical bore extending longitudinally through the base segment thereof and having a boss positioned at the end of each of the two leg segments thereof, each of said bosses having a cylindrical bore extending longitudinally therethrough, said bores of said bosses having a common axis and said axis of said boss bores being parallel to the axis of said base segment bore, said bosses being in such spaced relationship to each other to be adapted to receive therebetween, in slideable interfitting engagement, the base segment of the U-shaped frame member of a second of said link units, when said two link units are arranged in series in a chain, each of said bosses having a slot therein extending from the outside surface thereof into the bore thereof, whereby a plug weld can be formed in said boss slot thereby welding said boss to a cylindrical pintle fitted through said bores of said bosses, and each of said leg segments having an outwardly extending arm segment positioned thereon forwardly of and adjacent to said boss.

DESCRIPTION OF EMBODIMENTS OF THE INVENTION

Having been generally described, the present invention will be more readily understood from the following detailed description thereof given with reference to the attached drawing of which:

FIG. 1 is a perspective view of a specific embodiment of the link unit of the present invention.

FIG. 2 is a top view, partially broken away, showing one of the bosses of the link unit of FIG. 1.

FIG. 3 is a front view of the link boss of FIG. 2.

FIG. 4 is a top view, partially broken away, of another embodiment of the bosses of the link unit of the present invention.

FIG. 5 is a front view of the boss embodiment shown in FIG. 4.

FIG. 6 is a top view, partially broken away, showing the link unit of FIG. 1 in assembled position within a chain.

FIG. 7 is a sectional view of a portion of the assembled chain of FIG. 6 taken along line A—A.

FIG. 8 is a top view, partially broken away, showing another embodiment of the base segment of the link element of the present invention.

FIG. 9 is a side view of the portion of the link element shown in FIG. 8.

FIG. 10 is a side view of a bushing element optionally useful with the link unit of the present invention as shown in FIG. 8.

FIG. 11 is an end view of the bushing element shown in FIG. 10.

With reference to FIG. 1, numeral 1 generally designates an embodiment of the link unit of the present invention. As shown, link unit 1 comprises a U-shaped frame member consisting of base segment 2 to the ends of which are attached leg segments 3 and 4. Base segment 2 is provided with a cylindrical bore 15 having an axis 7a and which extends longitudinally through base segment 2. Base segment 2 at its rearward face 18 defines generally a sectioned cylinder whereby face 18 is an arcuate surface adapted to slideably engage a tooth 80 (FIGS. 6 and 7) of a chain driving sprocket. Leg segments 3 and 4 depend from base segment 2 and at their other ends are provided with a boss 5 and 6, respectively, with bosses 5 and 6 being in spaced relationship with respect to each other such that a base segment 2b of another link unit, similarly dimensioned with respect to its base segment as link unit 1, may fit in slideable interfitting engagement between and with bosses 5 and 6 of link 1.

Bosses 5 and 6 are provided with bores 8 and 9, respectively, which extend longitudinally therethrough and having a common axis 7 which is parallel to axis 7a of base segment 2. Boss 5 is provided with a slot 10, and boss 6 is provided with a slot 11, each of which slots 10 and 11 extends from the outer surface from its respective boss into the interior of bore 8 or 9. A boss slot, e.g. slot 10 of boss 5, may open outwardly at the rear surface of boss 5, as shown in FIGS. 4 and 5, and/or even on the outside lateral face of boss 5, as shown in FIGS. 4 and 5, wherein 20 is a vertical slot through boss 5 and 21 is a radial slot in the outside lateral face of boss 5 adjacent bore 8. Such boss slots are provided in accordance with the present invention to allow a plug weld to be formed therein, e.g. plug weld 70 in slot 10 of boss 5, thereby welding the boss rigidly to a pintle 40 fitted within the aligned bore 8 of boss 5, bore 9 of boss 6 of link unit 1 and bore 15b of base segment B of a succeeding link unit 1b to assemble link unit 1 into a chain comprising link units 1 and 1b.

In accordance with the preferred embodiments of the present invention weld plug slots open outwardly in the rear faces of the bosses. This latter feature minimizes shear forces on the plug welds in an assembled rotating chain containing the links, provides stronger and more durable assembled chains, and greatly contributes to the ease of assembly and disassembly of the link unit into and from a chain system due to the resultant ease of accessability.

Link unit 1 is also provided with outwardly extending arm segments 12 and 13 which are positioned on leg segments 3 and 4 forwardly of and adjacent to boss 5 and boss 6, respectively. It has been unexpectedly found that lateral arm segments 12 and 13 significantly extend the useful operating life of the link unit of the present invention when used in particulate material conveyor chain systems by slowing deterioration of legs 3 and 4 due to abrasion wear. Although lateral arms 12 and 13 of any size impart some improved abrasion wear-resistance to link unit 1, in the preferred embodiments maximum benefit is obtained by lateral arms 12 and 13 having a height which is essentially the same as those of leg segments 3 and 4 and bosses 5 and 6, and more preferably also having vertical lateral faces which are in the same respective vertical planes B—B and C—C, respectively, as the outside lateral surfaces of bosses 5 and 6.

In assembling the link unit of the present invention into a chain, link unit 1 is inserted into a series of link units forming a continuous closed chain wherein, as shown in FIG. 6, where the preceding link unit is designated 1a and the succeeding link unit in the chain is designated 1b. Elements of link units 1a and 1b similar to those of link unit 1 are designated by the same numeral, excepting that the letter a or b is added to identify the particular element as being part of the preceding or succeeding link element. In assembling such a continuous chain, i.e., a chain containing the following series of link units: 1a-1-1b . . . 1z-1a, link units 1a and 1b suitably may be identical to link unit 1 or may differ therefrom so long as the relative dimensions of links 1a, 1 and 1b allow them to be appropriately interfitting at their respective leg segments 2 and bosses 5 and 6.

In such an assembly, as shown in FIGS. 6 and 7, link unit 1 is placed in interfitting engagement with link unit 1a to align the bores of bosses 5a and 6a with bore 15, a pintle 40a is inserted into the resultant aligned overall bore, and plug welds 70a and 71a are placed and formed in slots 10a and 11a respectively of bosses 5a and 6a, whereby bosses 5a and 6a are rigidly welded to pintle 40a to preclude any rotational movement of pintle 40a relative to bosses 5a and 6a but to allow for rotational movement of base segment 2 relative to pintle 40a. The process is then repeated to align and connect base segment 2b of link unit 1b between bosses 5 and 6 of link unit 1 via pintle 40 and plug welds 70 and 71, the latter being shown in dotted lines. So assembled, it will be noted, a rigid, four-sided, particulate material-conveying member is formed comprising link unit 1, pintle 40 and plug welds 70 and 71. This rigid feature of the units of the present invention further imparts an overall strength and wear life characteristic which is improved as compared to convention drag links.

When desired or needed, link unit 1 may be removed from a chain containing same by merely removing plug welds 70a, 71a, 70 and 71 by means of a cutting torch or the like to free pintles 40a and 40 for removal. An advantage of the present invention is that, if care is taken to avoid damage to the pintles, such as at 41 in slot 11, the pintles are reusable in chain systems using link units of the present invention. As will be apparent, furthermore, since the links of the present invention do not require the use of locking pins and the like the invention thereby eliminates the need for aligning slots in the pintles and bosses of the respective links for insertion of such locking pins and the like. Assembly into and disassembly from the chain systems rapidly and efficiently can be carried out using the links of the present invention.

As stated, using the links of the present invention, the only relative movement within a chain is between a base segment 2 of one link and the pintle 40a of a preceding link-pintle rigid member. It is contemplated in the present invention to mimimize the wear on base segment 2 in such an arrangement by providing base segment 2 at each end of bore 15 with longitudinal enlargements 28 and 29 of bore 15 which extend a limited distance into the body of base segment 2 and positioning within bore enlargements 28 and 29 cylindrical bushings 30 and 31, the latter of which, when pintle 40a is in place within base segment 2 containing such bushings, absorb at least a portion of the frictional forces cause by relative rotational movement between base segment 2 and pintle 40a.

Further embodiments of the link units and continuous chains formed therefrom of the present invention are contemplated wherein at least a portion or all of the surfaces of link unit 1 are covered with a supplemental coating of an abrasion-resistant material such as is provided by fusing beads 60 of conventional welding electrode material to the faces of link unit 1. Other embodiments are contemplated wherein attached to link unit 1 in a suitable manner, such as by welding, is a conventional supplemental work element such as a shovel element 90 or bucket, cover and the like.

I claim:

1. A link unit for continuous chains comprising a U-shaped frame member having a cylindrical bore extending longitudinally through the base segment thereof and having a boss positioned at the end of each of the two leg segments thereof, each of said bosses having a cylindrical bore extending longitudinally therethrough, said bores of said bosses having a common axis and said axis of said boss bores being parallel to the axis of said base segment bore, said bosses being in such space relationship to each other to be adapted to receive therebetween, in slideable interfitting engagement, the base segment of the U-shaped frame member of a second of said link units, when said two link units are arranged in series in a chain, each of said bosses having a slot therein extending from the outside surface thereof into the bore thereof, whereby a plug weld can be formed in said boss slot thereby welding said boss to a cylindrical pintle fitted through said bores of said bosses, and each of said leg segments having an outwardly extending arm segment positioned thereon forwardly of and adjacent to said boss.

2. The chain link unit according to claim 1 where said plug weld slot is located in the rear face of said boss.

3. The chain link unit according to claim 1 wherein the vertical heights of said leg segments of said arm-bearing U-shaped frame member, said bosses, and said lateral arm elements are essentially the same.

4. The chain link unit according to claim 1 wherein said base segment of said arm-bearing U-shaped frame member has, at each end of said longitudinal bore extending therethrough, a longitudinal enlargement of said bore extending a limited distance into the body of said base segment, whereby said base segment is adapted to receive, within said longitudinal bore thereof, a pintle adapted for rotational movement relative to said base segment bore and to further receive, within said end enlargements of said bore, cylindrical bushing elements which slideably contact said base segment bore pintle and which absorb at least a portion of the frictional forces caused by relative rotational movement between said base segment bore and said base segment bore pintle.

5. The chain link unit according to claim 1 wherein a supplemental work element is attached to said arm-bearing U-shaped frame element.

6. The chain link unit according to claim 1 wherein at least a portion of the outside surface thereof is covered with a coating of an abrasion-resistant material.

7. The chain link unit according to claim 2 wherein the vertical heights of said leg segments of said arm-bearing U-shaped frame member, said bosses, and said lateral arm elements are essentially the same.

8. The chain link unit according to claim 2 wherein said base segment of said arm-bearing U-shaped frame member has, at each end of said longitudinal bore extending therethrough, a longitudinal enlargement of said bore extending a limited distance into the body of said base segment, whereby said base segment is adapted to receive, within said longitudinal bore thereof, a pintle adapted for rotational movement relative to said base segment bore and to further receive, within said end enlargements of said bore, cylindrical bushing elements which slideably contact said base segment bore pintle and which absorbs at least a portion of the frictional forces cause by relative rotational movement between said base segment bore and said base segment bore pintle.

9. The chain link unit according to claim 2 wherein a supplemental work element is attached to said arm-bearing U-shaped frame element.

10. The chain link unit according to claim 2 wherein at least a portion of the outside surface thereof is covered with a coating of an abrasion-resistant material.

11. A continuous chain comprising a link unit according to claim 1 and wherein said link unit is maintained within said chain by a forward pintle which is positioned within said base segment of said arm-bearing U-shaped frame element and the bosses of a preceding link in said chain and by a rear pintle which is positioned within and extended through the bosses of said arm-bearing link unit and the base segment of a succeeding link in said chain and wherein plug welds are positioned in said boss slots to thereby rigidly weld said rear pintle to said bosses of said arm-bearing link unit.

* * * * *